(12) United States Patent
Yau et al.

(10) Patent No.: US 11,095,207 B1
(45) Date of Patent: Aug. 17, 2021

(54) POWER FACTOR CORRECTION CIRCUIT WITH BURST SETTING AND METHOD OF OPERATING THE SAME

(71) Applicant: ASIAN POWER DEVICES INC., Taoyuan (TW)

(72) Inventors: Yeu-Torng Yau, Taoyuan (TW); Tsung-Liang Hung, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 0 days.

(21) Appl. No.: 16/859,147

(22) Filed: Apr. 27, 2020

(30) Foreign Application Priority Data

Feb. 17, 2020 (TW) .................................. 109104950

(51) Int. Cl.
*H02M 1/42* (2007.01)
*H02M 1/00* (2006.01)
*H02M 3/157* (2006.01)
*H02M 7/06* (2006.01)

(52) U.S. Cl.
CPC ......... *H02M 1/4225* (2013.01); *H02M 3/157* (2013.01); *H02M 7/06* (2013.01); *H02M 1/0035* (2021.05); *H02M 1/0085* (2021.05); *H02M 1/4208* (2013.01)

(58) Field of Classification Search
CPC ............. H02M 1/0035; H02M 1/0085; H02M 1/4208; H02M 1/4225
USPC .................................. 323/284, 285; 363/126
See application file for complete search history.

(56) References Cited

U.S. PATENT DOCUMENTS

| 8,541,731 | B2 | 9/2013 | Sugawa et al. | |
|---|---|---|---|---|
| 9,859,788 | B2* | 1/2018 | Maruyama | H02M 1/4225 |
| 10,141,830 | B1* | 11/2018 | Chung | H05B 45/10 |
| 10,186,948 | B2* | 1/2019 | Moon | H02M 1/083 |
| 2007/0145957 | A1* | 6/2007 | Wu | H02M 3/1563 323/222 |
| 2010/0110739 | A1* | 5/2010 | Nishikawa | H02M 1/4225 363/124 |
| 2011/0267024 | A1* | 11/2011 | Halberstadt | H02M 3/156 323/304 |
| 2012/0092900 | A1* | 4/2012 | Orr | H02M 7/217 363/21.03 |
| 2012/0201063 | A1* | 8/2012 | Sugawara | H02M 3/156 363/89 |

(Continued)

FOREIGN PATENT DOCUMENTS

CN 203967971 U 11/2014
CN 206962730 U 2/2018
(Continued)

*Primary Examiner* — Gary A Nash
(74) *Attorney, Agent, or Firm* — Muncy, Geissler, Olds & Lowe, P.C.

(57) ABSTRACT

A power factor correction circuit with burst setting includes a conversion circuit, a control unit, and a burst setting circuit. The burst setting circuit respectively sets at least one burst period when an input power source is at a rising edge of a positive half cycle, a falling edge of the positive half cycle, the rising edge of a negative half cycle, and the falling edge of the negative half cycle, and provides a burst setting signal corresponding to the at least one burst period to the control unit so that the control unit limits the conversion circuit to perform a burst operation during the at least one burst period.

18 Claims, 8 Drawing Sheets

(56) References Cited

U.S. PATENT DOCUMENTS

2012/0250378 A1\* 10/2012 Kok ............... H02M 3/156
  363/78
2016/0241134 A1\* 8/2016 Maruyama .......... H02M 1/4225

FOREIGN PATENT DOCUMENTS

TW       276393 B   5/1996
TW    201705658 A   2/2017

\* cited by examiner

POWER FACTOR CORRECTION CIRCUIT WITH BURST SETTING AND METHOD OF OPERATING THE SAME

BACKGROUND

Technical Field

The present disclosure relates to a power factor correction circuit with burst setting, and more particularly to a power factor correction circuit capable of performing a burst operation during a specific period.

Description of Related Art

The statements in this section merely provide background information related to the present disclosure and do not necessarily constitute prior art.

In the field of power factor correctors today, as more and more emphasis are placed on the high efficiency of the power factor corrector, circuit designs for increasing the efficiency of the power factor corrector are becoming more diverse. When the load of the power factor corrector is light, the current required by the load is small, and the controller does not need to continuously control the power factor corrector to meet the current required by the load. In order to improve the efficiency of the power factor corrector, when the load is light, a burst mode control manner is usually used to control the power factor corrector.

Figure 1:
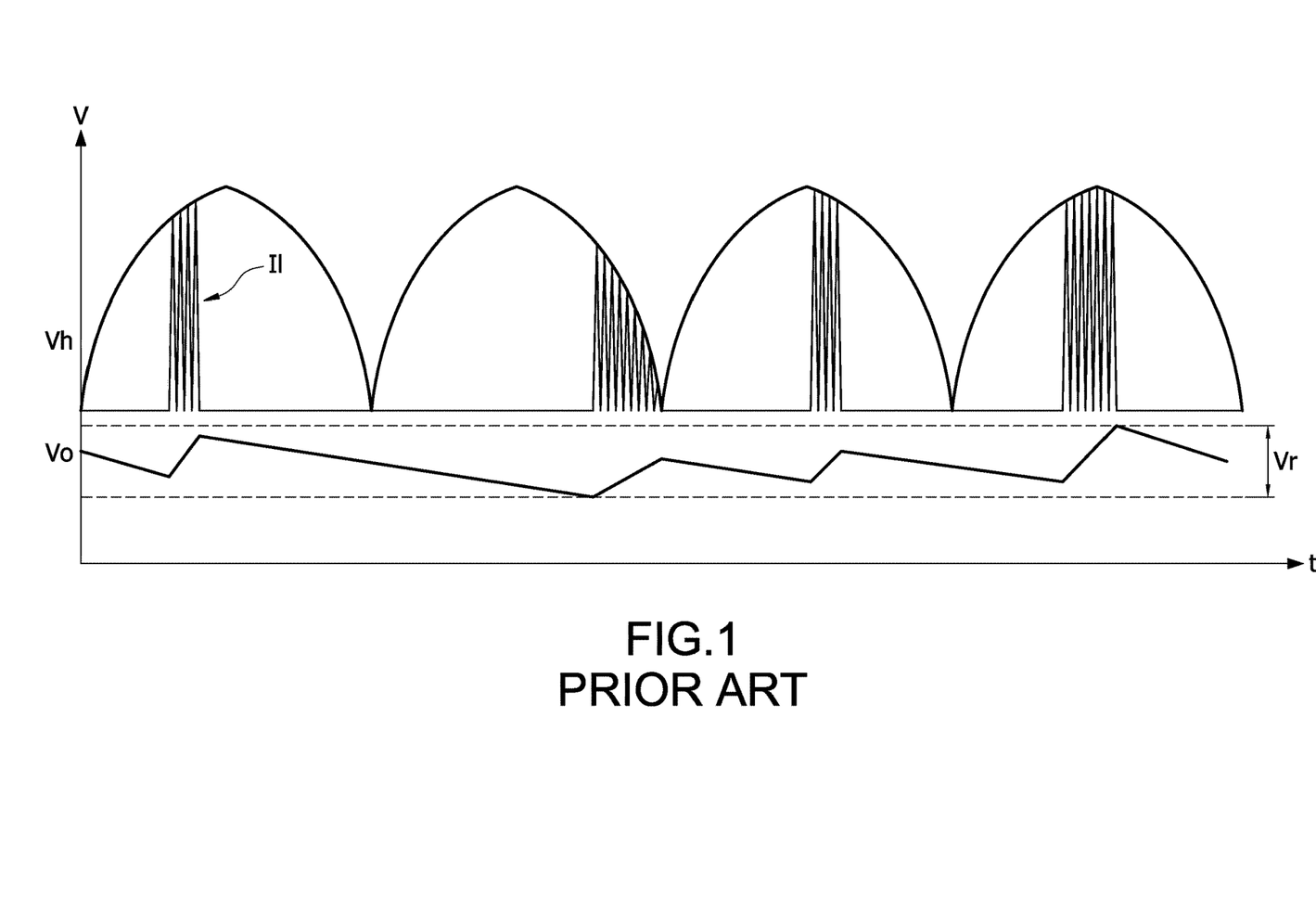
FIG. 1 is a waveform of a power factor correction circuit with burst setting in a related art.

When the power factor corrector is operated at light load, the controller controls the power factor corrector to operate in the bust mode control manner. When the output power source Vo of the power factor corrector is insufficient, the controller controls the operation of the power factor corrector so that the inductor inside the power factor corrector starts to store and release energy and generates an inductor current Il. As the input current of the power factor corrector follows the input power source, the inductor current Il corresponding to the input current and the half wave voltage Vh corresponding to the input power source are shown in FIG. 1. It can be clearly seen from FIG. 1 that the burst mode control of the controller is a random action, which does not have a fixed cycle or is synchronized with the mains. Therefore, the ripple voltage Vr of the output power source Vo is slightly irregular, which causes the ripple voltage Vr to be large and makes the quality of the output power source Vo poor. Moreover, when the half wave voltage Vh is close to zero (i.e., the input power source is close to zero), more switching times are required to increase the voltage value of the output power source Vo to the upper limit value, which results in lower conversion efficiency when the input power source is close to zero.

Therefore, how to design a power factor correction circuit with burst setting and use a burst setting circuit to set the timing of the power factor corrector to perform a burst operation is a major issue for the inventor of the present disclosure.

SUMMARY

In order to solve the above-mentioned problems, a power factor correction circuit with burst setting is provided. The power factor correction circuit with burst setting includes a conversion circuit, a control unit, and a bust setting circuit. The conversion circuit receives an input power source. The control unit is coupled to the conversion circuit and controls the conversion circuit to convert the input power source into an output power source. The burst setting circuit is coupled to the conversion circuit and the control unit. The burst setting circuit respectively sets at least one burst period at a rising edge of a positive half cycle, a falling edge of the positive half cycle, the rising edge of a negative half cycle, and the falling edge of the negative half cycle, and provides a burst setting signal corresponding to the at least one burst period to the control unit so that the control unit limits the conversion circuit to perform a burst operation during the at least one burst period.

In order to solve the above-mentioned problems, a method of operating a power factor correction circuit with burst setting is provided. The method includes steps of: (a) providing a control unit to control a conversion circuit to convert an input power source into an output power source, (b) respectively setting at least one burst period at a rising edge of a positive half cycle, a falling edge of the positive half cycle, the rising edge of a negative half cycle, and the falling edge of the negative half cycle, and providing a burst setting signal corresponding to the at least one burst period, and (c) limiting, by the control unit, the conversion circuit to perform a burst operation during the at least one burst period according to the burst setting signal.

In summary, the main advantages and effects of the embodiments of the present disclosure are that the power factor correction circuit with burst setting uses a burst setting circuit to detect the waveform of the input power source, and sets a specific period during which the conversion circuit can perform burst operation according to the waveform of the input power source so as to significantly reduce the ripple voltage of the output power source. In addition, the secondary advantages and effects of the embodiments of the present disclosure are that the specific period during which the conversion circuit can perform burst operation is set at a non-zero point of the input power source to avoid the need to provide a longer burst period to increase the voltage value of the output powers source, and further improve the conversion efficiency of the power factor correction circuit.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Reference will now be made to the drawing figures to describe the present disclosure in detail. It will be understood that the drawing figures and exemplified embodiments of present disclosure are not limited to the details thereof.

Figure 2:
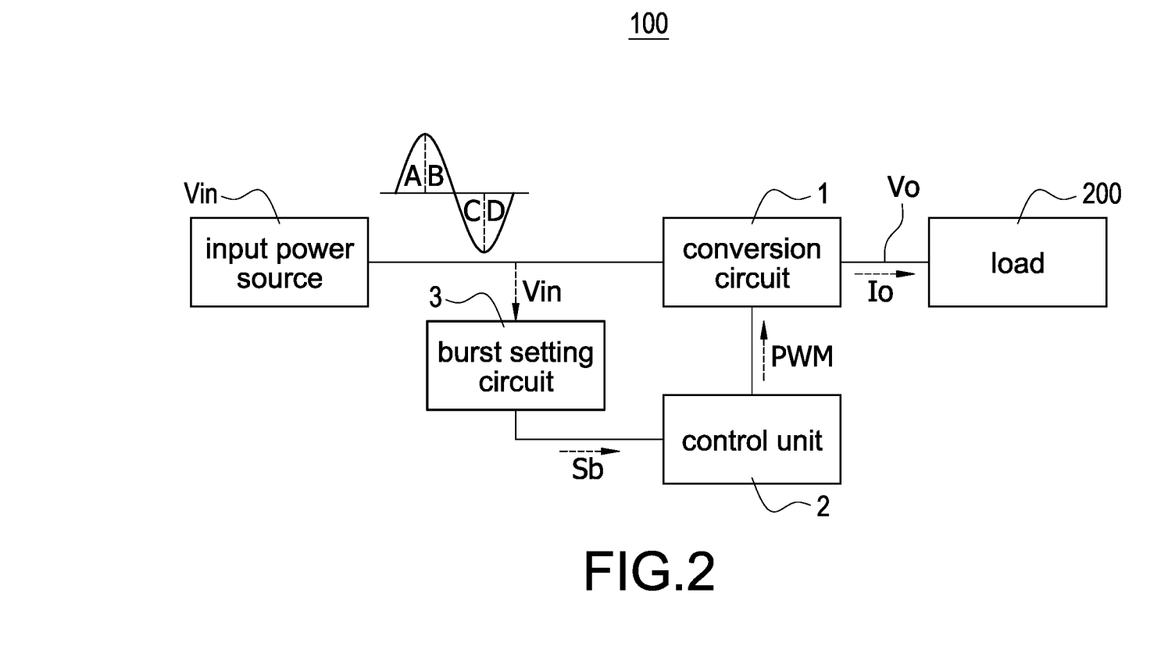
FIG. 2 is a block diagram of a power factor correction circuit with burst setting according to the present disclosure.

Please refer to FIG. 2, which shows a block diagram of a power factor correction circuit with burst setting according to the present disclosure. The power factor correction circuit 100 converts an AC input power source Vin into a DC output power source Vo, and provides the output power source Vo to a load 200. The power factor correction circuit 100 includes a conversion circuit 1, a control unit 2, and a burst setting circuit 3. The conversion circuit 1 is coupled to the burst setting circuit 3, and the control unit 2 is coupled to the conversion circuit 1 and the burst setting circuit 3. The control unit 2 controls the conversion circuit 1 to convert the input power source Vin into the output power source Vo, and corrects the power factor of an input current, that is a waveform of the input current follows a waveform of the input power source Vin through controlling the conversion circuit 1 by the control unit 2. The burst setting circuit 3 detects the input power source Vin (it is indicated by dotted lines due to multiple detection manners), and respectively sets at least one burst period when the input power source Vin is at a rising edge of a positive half cycle A, a falling edge of the positive half cycle B, the rising edge of a negative half cycle C, and the falling edge of the negative half cycle D. In other words, four waveforms A-D respectively has more than one burst period, and the number of burst periods is a multiple of 4. The burst setting circuit 3 provides a burst setting signal Sb correspond to the burst period to the control unit 2 so that the control unit 2 limits the conversion circuit 1 to perform a burst operation during the at least one burst period in the four waveforms A-D according to the burst setting signal Sb.

Specifically, when the load 200 of the power factor correction circuit 100 is a heavy load (i.e., an output current Io required by the load 200 is large), the control unit 2 must continuously control the operation of the conversion circuit 1 so that the conversion circuit 1 provides a sufficient output current Io to the load 200. Since the output current Io drawn by the load 200 is relatively large, the conversion circuit 1 must continue to work to maintain the voltage value of the output power source Vo above a predetermined value. When the load 200 of the power factor correction circuit 100 is a light load (i.e., the output current Io required by the load 200 is small), the control unit 2 does not need to continuously control the operation of the conversion circuit 1 to meet the output current Io required by the load 200. Therefore, the control unit 2 may use a burst mode manner to control the conversion circuit 1. That is, that the control unit 2 only needs to provide a pulse width modulation signal PWM to control conversion circuit 1 in the burst operation when the voltage value of the output power source Vo is lower than the predetermined value. When the voltage value of the output power source Vo is higher than an upper limit value, the pulse width modulation signal PWM is stopped and the conversion circuit 1 is not operated. However, under the condition of light load, the burst mode only provides the PWM signal when the voltage value of the output power source Vo is lower than the predetermined value. When the voltage value of the output power source Vo is higher than the upper limit value, the pulse width modulation signal PWM is stopped. Therefore, the pulse width modulation signal PWM provided by the control unit 2 in the burst mode is randomly provided, and the burst period does not have a specific cycle or is synchronized with the mains. Therefore, the ripple voltage (i.e., a difference value between the predetermined value and the upper limit value) of the output power source Vo becomes very large. When the input power source Vin is close to zero, the energy provided by the input power source Vin is small (i.e., the value of the AC voltage is close to zero), and a longer burst period is required to increase the voltage value of the output power source Vo. Therefore, in addition to the ripple voltage of the output power source Vo becoming larger, controlling the conversion circuit 1 to perform the burst operation when the input power source Vin is close to zero will further lead to the disadvantage of low conversion efficiency.

The main object of the present disclosure is to use the burst setting circuit 3 to detect that the input power source Vin is at the rising edge of the positive half cycle A, the falling edge of the positive half cycle B, the rising edge of the negative half cycle C, and the falling edge of the negative half cycle D. Also, setting the specific period (i.e., the burst period) during that the conversion circuit 1 can perform the burst operation in the four waveforms A-D. Therefore, the pulse width modulation signal provided by the control unit 2 in the burst mode is no longer randomly provided, and the burst period has a specific cycle synchronized with the mains. Therefore, compared with the conventional burst mode, the burst setting circuit 3 of the present disclosure can significantly reduce the ripple voltage of the output power source Vo. Since the burst setting circuit 3 has the specific period for setting the burst operation of the conversion circuit 1, it can avoid the situation that the control unit 2 controls the burst operation of the conversion circuit 1 when the input power source Vin approaches zero, thereby increasing the conversion efficiency of the power factor correction circuit 100.

Figure 3:
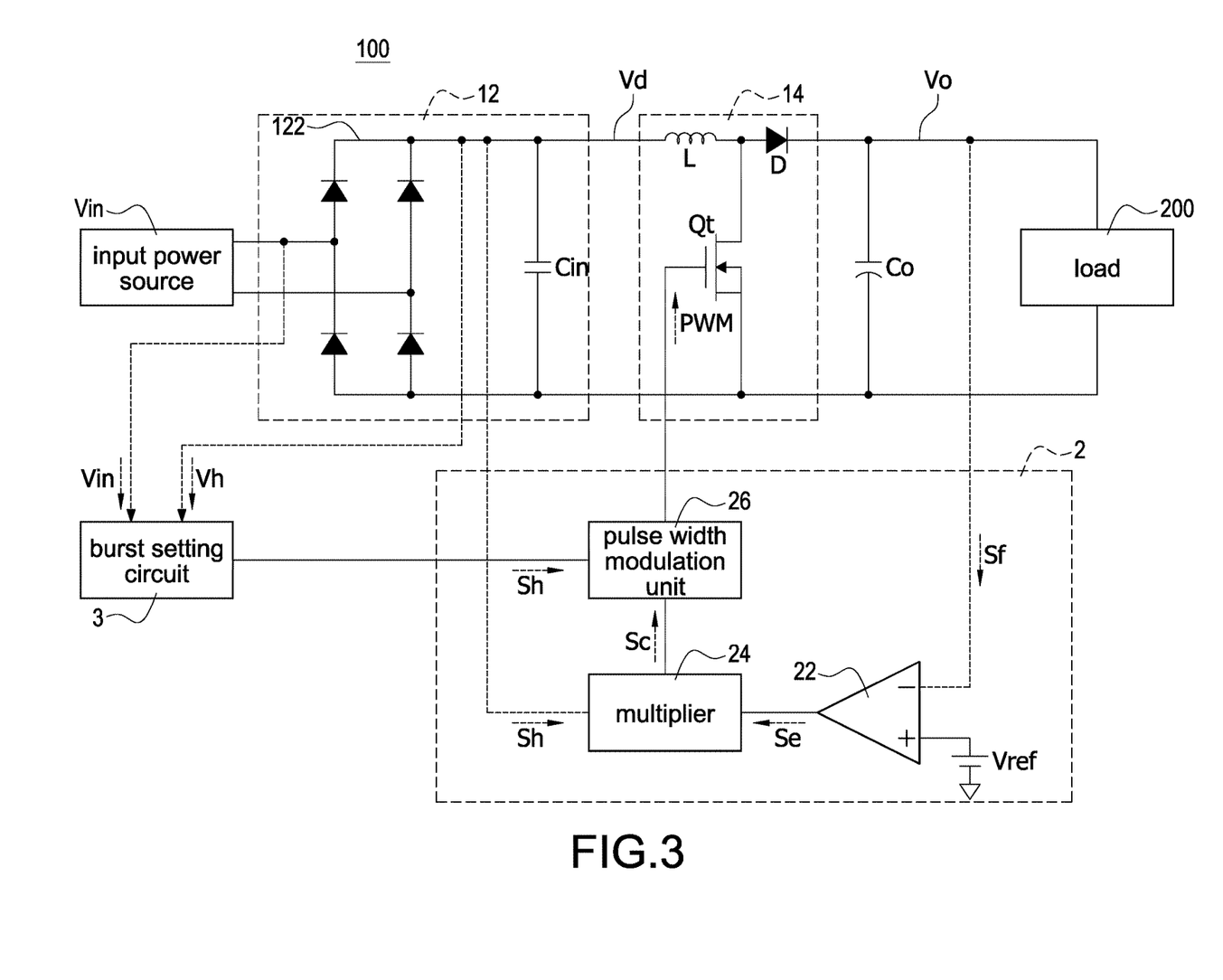
FIG. 3 is a block circuit diagram of a conversion circuit and a control unit according to the present disclosure.

Please refer to FIG. 3, which shows a block circuit diagram of a conversion circuit and a control unit according to the present disclosure, and also refer to FIG. 2. The conversion circuit 1 includes a rectifying unit 12 and a conversion unit 14. The conversion unit 14 is coupled to the rectifying unit 12 and the control unit 2. The rectifying unit 12 includes a rectifier 122 and an input capacitor Cin. In one embodiment, the conversion unit 14 is a boost converter as an illustrative example. The rectifier 122 receives the input power source Vin and rectifies the input power source Vin into a half wave voltage Vh. The input capacitor Cin filters the half wave voltage Vh into a DC power source Vd, and provides the DC power source Vd to the conversion unit 14. The conversion unit 14 includes at least one power switch Qt and at least one power inductor L, and the power switch Qt is coupled to the control unit 2. The control unit 2 provides a pulse width modulation signal PWM to control the power switch Qt to be repeatedly switched on/off so that the power inductor L is stored energy or released energy according to the switched on/off of the power switch Qt, and therefore the conversion unit 14 is used to convert the DC power source Vd into the output power source Vo according to the energy storage and the energy release of the power inductor L. In one embodiment, the conversion unit 14 may be a switching power converter, and the number of the power switch Qt and the number of the power inductor L are determined by the type of the switching power converter, and will not be repeated here.

The control unit 2 includes a comparison unit 22, a multiplier 24, and a pulse width modulation unit 26. The multiplier 24 is coupled to the comparison unit 22, the pulse width modulation unit 26, and the rectifier 122. The comparison unit 22 may be coupled to an output end (indicated by dotted lines) of the conversion unit 14 through for example but not limited to a voltage dividing circuit (not shown) to receive a feedback signal Sf corresponding to the output power source Vo, and to provide an error signal Se to the multiplier 24 according to an error between the feedback signal Sf and the reference voltage Vref. The comparison unit 22 may form an error amplifying circuit with an external impedance circuit (not shown). Similarly, the multiplier 24 may be coupled to the rectifier 122 (indicated by dotted lines) through for example but not limited to the voltage dividing circuit (not shown) to receive a half wave signal Sh corresponding to the half wave voltage Vh, and to provide a control signal Sc by multiplying the error signal Se by the half wave signal Sh to the pulse width modulation unit 26. The pulse width modulation unit 26 is coupled to the power switch Qt and the burst setting circuit 3, and provides the pulse width modulation signal PWM to control the conversion unit 14 to stably output the voltage value of the output power source Vo according to the control signal Sc.

The burst setting circuit 3 may be coupled to an input end (indicated by dotted lines) of the rectifying unit 12 to receive the input power source Vin, or may be coupled to an output end (indicated by dotted lines) of the rectifying unit 12 to receive the half wave voltage Vh. The burst setting circuit 3 provides the burst setting signal Sb to the pulse width modulation unit 26 according to the input power source Vin or the half wave voltage Vh so that the pulse width modulation unit 26 provides the pulse width modulation signal PWM to the conversion unit 14 only during the burst period corresponding to the burst setting signal Sb. In one embodiment, it is not limited that the control unit 2 is only composed of the comparison unit 22, the multiplier 24, and the pulse width modulation unit 26. However, it is determined according to the type of the conversion unit 14. In one embodiment, since the conversion unit 14 is a booster converter, and therefore, it can be controlled by, for example but not limited to, the control unit 2 shown in FIG. 3. However, if the conversion unit 14 is, for example, but not limited to, a buck or flyback converter, the composition of the components inside the control unit 2 depends on the buck or flyback converter. Therefore, regardless of the composition of the components inside the control unit 2, the burst setting circuit 3 can be coupled to the pulse width modulation unit 26 inside the control unit 2 so that the conversion unit 14 can acquire the effect of the burst setting. The reason why the conversion circuit 1 and the control unit 2 shown in FIG. 3 are used is that the circuit structure of the conversion circuit 1 is simple, and the application field of the boost converter is wide (such as a power supply). Moreover, the internal circuit structure of the control unit 2 is simple, and the control for power factor correction is relatively easy. Therefore, the application of the conversion circuit 1 and the control unit 2 shown in FIG. 3 with the burst setting circuit 3 is the best implementation, which can achieve the power factor correction circuit 100 with low circuit cost, simple operation, and universal use.

Figure 4A:
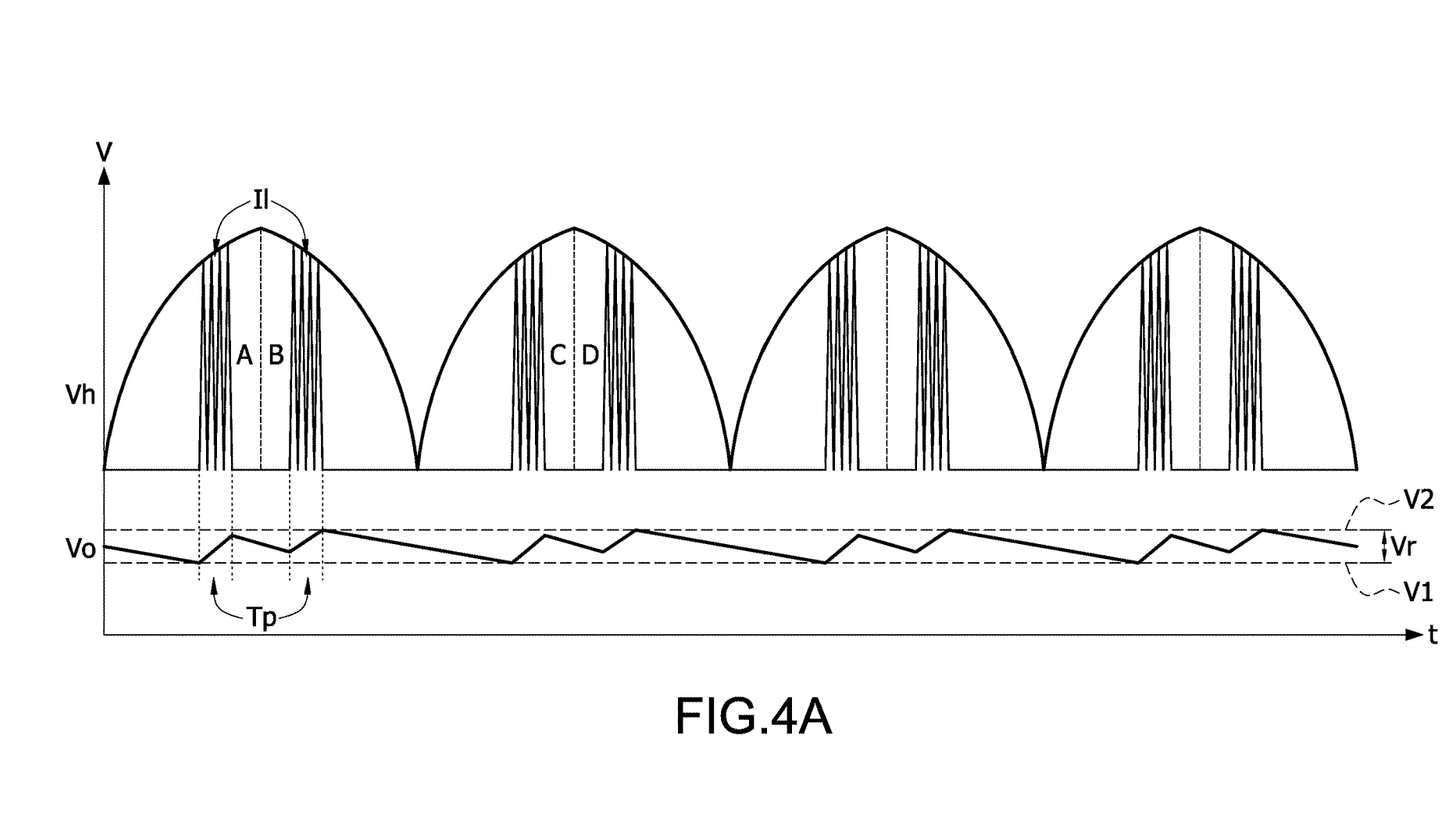
FIG. 4A is an operation waveform of the power factor correction circuit with the burst setting according to a first embodiment of the present disclosure.
Figure 4B:
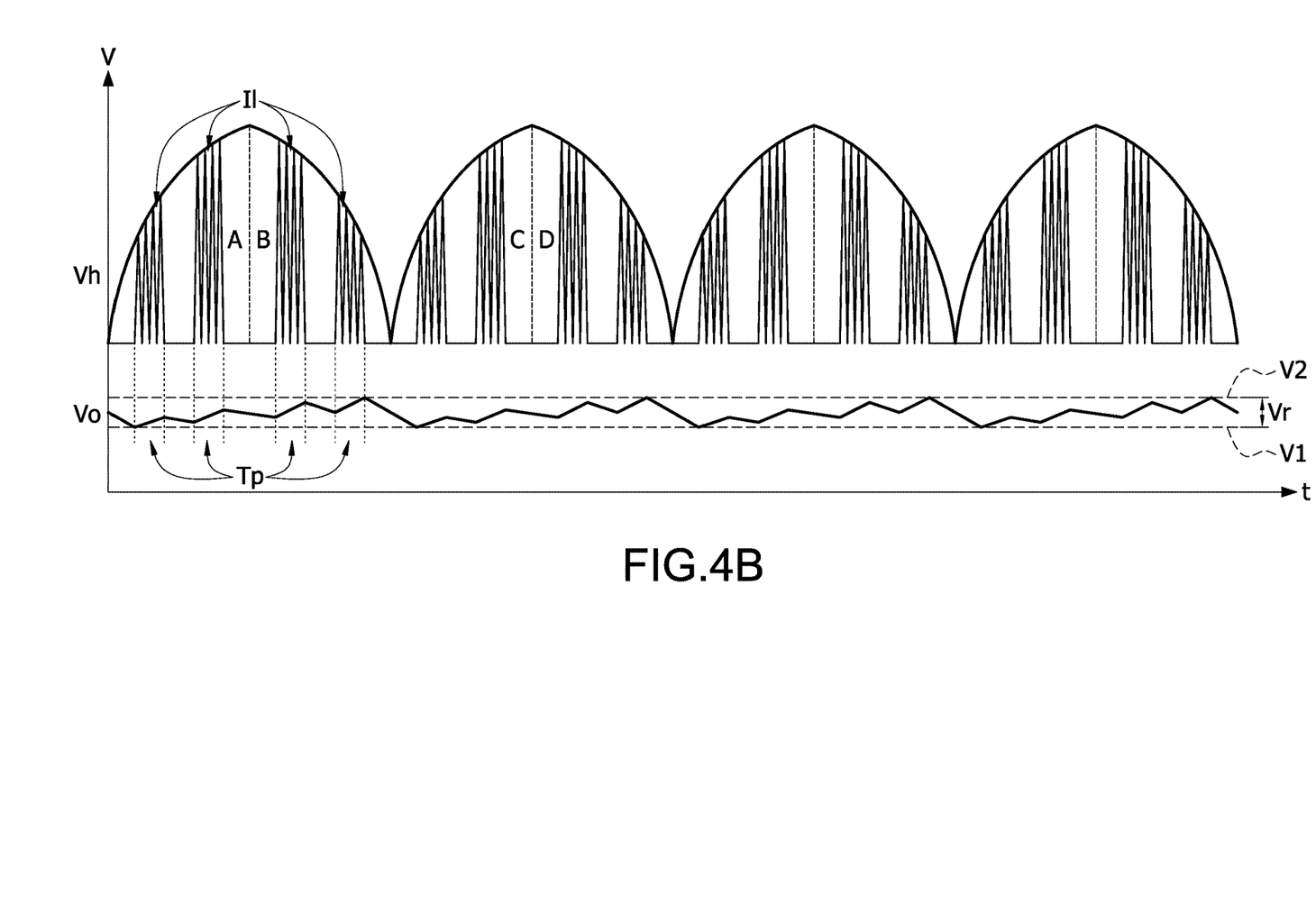
FIG. 4B is an operation waveform of the power factor correction circuit with the burst setting according to a second embodiment of the present disclosure.

Please refer to FIG. 4A and FIG. 4B, which shows operation waveforms of the power factor correction circuit with the burst setting according to a first embodiment and a second embodiment of the present disclosure, respectively, and also refer to FIG. 2 and FIG. 3. In FIG. 4A, each of the four waveforms A-D in the half wave voltage Vh has a burst period Tp. In FIG. 4B, each of the four waveforms A-D in the half wave voltage Vh has two burst periods Tp. When the load 200 is light, the burst setting circuit 3 provides the burst setting signal Sb to the pulse width modulation unit 26 to limit that the control unit 2 controls the power switch Qt only during the burst periods Tp. Therefore, during the burst periods Tp, an inductor current Il stores or releases energy according to the pulse width modulation signal PWM by controlling switching on the power switch Qt so that the inductor current Il is a triangle wave. In one embodiment of the present disclosure, as shown in FIG. 4A and FIG. 4B, since the control unit 2 uses a boundary conduction mode (BCM), the inductor current Il will decrease (release energy) to zero and then to store energy. However, a continuous conduction mode (CCM) or a discontinuous conduction mode (DCM) can be used according to the control type of the control unit 2 so it is not limited to the boundary conduction mode.

Take FIG. 4A as an example, when the output power source Vo decreases to a predetermined value V1, the control unit 2 provides the pulse width modulation signal PWM according to the burst periods Tp provided by the burst setting circuit 3 so that the output power source Vo starts to increase at a working start point of the burst period Tp. When a working end point of the burst period Tp is reached, the control unit 2 stops providing the pulse width modulation signal PWM so that the output power source Vo starts to decrease. The burst setting circuit 3 can set the output power source Vo to rise from a predetermined value V1 to an upper limit value V2 in a half wave (i.e., the waveforms A-B or C-D). That is, the output power source Vo is increased in two steps from the predetermined value V1 to the upper limit value V2 in the waveforms A-B, and shown in FIG. 4B, the output power source Vo is increased in four steps. Therefore, by increasing the output power source Vo in steps, the ripple voltage Vr of the output power source Vo can be limited to a smaller range (V1 to V2).

Since the burst periods Tp are set by the burst setting circuit 3, in one half wave, the burst periods Tp may be asymmetrically arranged. For example but not limited to that the burst periods Tp may be set in 20% and 60% of the half wave, or 20% and 75% of the half wave, etc. However, for the purpose of reducing the magnitude of the ripple voltage Vr as much as possible, the burst periods Tp are preferably set in a symmetrical arrangement. For example but not limited to that the burst periods Tp may be set in 20% and 80% of the half wave, or 40% and 60% of the half wave, etc. The lengths of the burst periods Tp in the waveform A and the waveform B (or the waveform C and the waveform D) may be equal or unequal. However, for the purpose of reducing the magnitude of the ripple voltage Vr as much as possible, the lengths of the burst periods Tp in the waveform A and the waveform B (or the waveform C and the waveform D) are preferably equal. In one embodiment of the present disclosure, it is not limited that the number of burst periods Tp must be the same as that of FIG. 4A and FIG. 4B. That is, the number of the burst periods Tp can be increased according to actual needs, and it is limited that the number of the burst period Tp must be at least two or more. In addition, the number of burst periods Tp is basically a multiple of two. However, if the burst period Tp between two half waves is connected due to the load increase, and the number of burst periods Tp may be odd.

In addition, in order to prevent the burst period Tp from occurring when the input power source yin approaches zero, the input power cannot provide enough energy, or when the input power source Vin approaches the peak, the output power source Vo increases too fast, therefore, the midpoint of the burst period Tp is best designed to avoid the zero and peak values of a half wave. When the load 200 is gradually increased from a light load to a heavy load, the width of the burst period Tp will extend from the midpoint of the burst period Tp to both sides so that the triangular wave of the inductor current Il will also extend from the midpoint of the burst period Tp to both sides until the triangle wave of the inductor current Il occupies half of the wave. Therefore, the period width of the burst period Tp is proportional to the load size of the conversion circuit 1. When the load 200 is closer to the light load, the period width of the burst period Tp is smaller, and when the load 200 is closer to the heavy load, the period width of the burst period Tp is larger. The difference between the waveform in FIG. 4B and the waveform in FIG. 4A is only that the four waveforms of A-D each has two burst periods Tp, and the rest of the operation manners are the same as those in FIG. 4A, and will not be repeated here.

Figure 5:
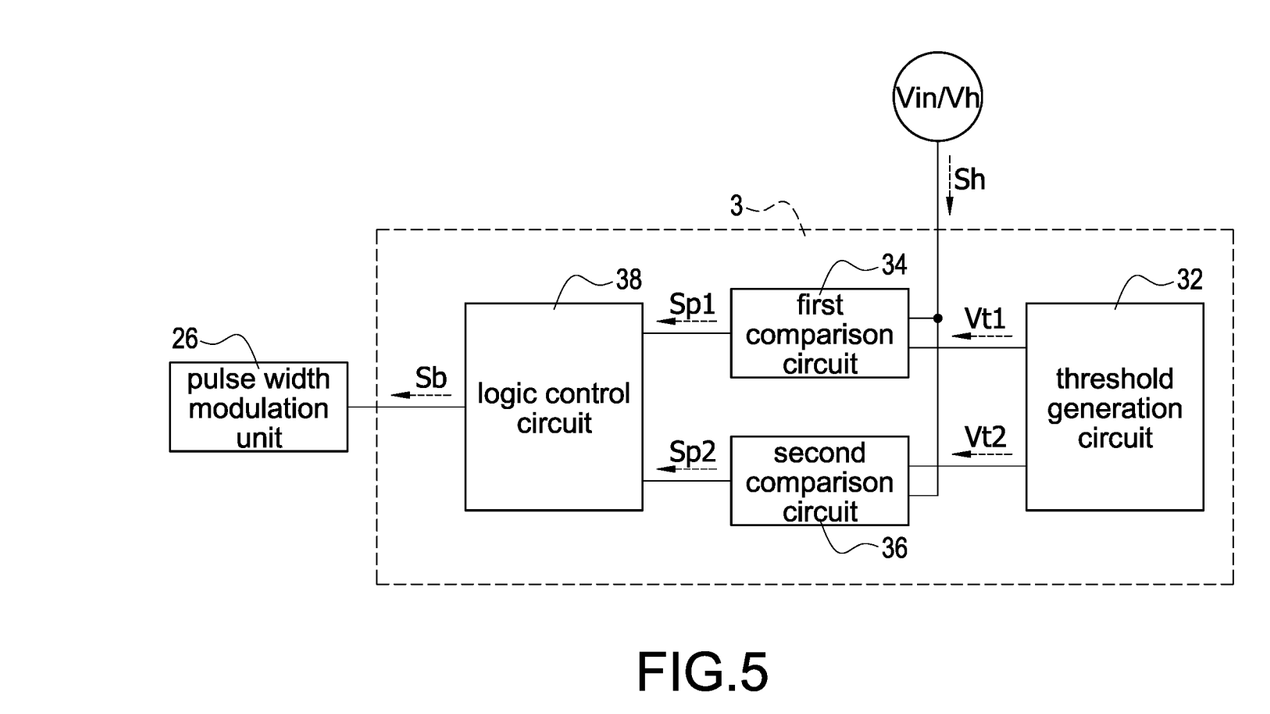
FIG. 5 is a block diagram of a burst setting circuit according to the present disclosure.

Please refer to FIG. 5, which shows a block diagram of a burst setting circuit according to the present disclosure, and also refer to FIG. 2 to FIG. 4B. The burst setting circuit 3 includes a threshold generation circuit 32, a first comparison circuit 34, a second comparison circuit 36, and a logic control circuit 38. The first comparison circuit 34 and the second comparison circuit 36 are coupled to the threshold generation circuit 32 and the logic control circuit 38. The threshold generation circuit 32 provides at least one first threshold voltage Vt1 and at least one second threshold voltage Vt2, and the threshold voltage is proportional to the number of burst periods Tp. Take FIG. 4A as an example, each half wave has two burst periods Tp, and therefore only two threshold voltages are needed (i.e., a first threshold voltage Vt1 and a second threshold voltage Vt2. Take FIG. 4B as an example, at least three threshold voltages are needed (i.e., the number of the threshold voltages is four, but two of them can be the same voltage value. The first comparison circuit 34 compares the first threshold voltage Vt1 with a half wave signal Sh, and provides at least one first comparison signal Sp1 to the logic control circuit 38 according to the comparison result. The second comparison circuit 36 compares the second threshold voltage Vt2 with the half wave signal Sh, and provides at least one second comparison signal Sp2 to the logic control circuit 38 according to the comparison result. In particular, the half wave signal Sh can be provided by the input power source Vin or the half wave voltage Vh.

Specifically, the burst setting circuit 3 can be coupled to an input end of the conversion circuit, and the input power source Vin may be rectified into the half wave signal Sh through, for example but not limited to, an additional rectifier circuit (not shown) and the voltage dividing circuit. Alternatively, the burst setting circuit 3 can be coupled between the rectifying unit 12 and the input capacitor Cin, and the half wave voltage Vh may be divided into the half wave signal Sh through, for example but not limited to an additional voltage dividing circuit. In particular, the voltage division circuit (not shown) is shared with the multiplier 24. After the half wave voltage Vh is divided by a single voltage division circuit, a same half wave signal Sh is provided to the multiplier 24, the first comparison circuit 34, and the second comparison circuit 36. Alternatively, the voltage division circuit (not shown) is not shared with the multiplier 24. After the half wave voltage Vh is divided by a first voltage division circuit (not shown), a first type of half wave signal Sh is provided to the multiplier 24; after the half wave voltage Vh is divided by a second voltage division circuit (not shown), a second type of half wave signal Sh is provided to the first comparison circuit 34 and the second comparison circuit 36. The logic control circuit 38 provides the burst setting signal Sb to the pulse width modulation unit 26 of the control unit 2 according to the at least one first comparison signal Sp1 and the at least one second comparison signal Sp2.

Figure 6:
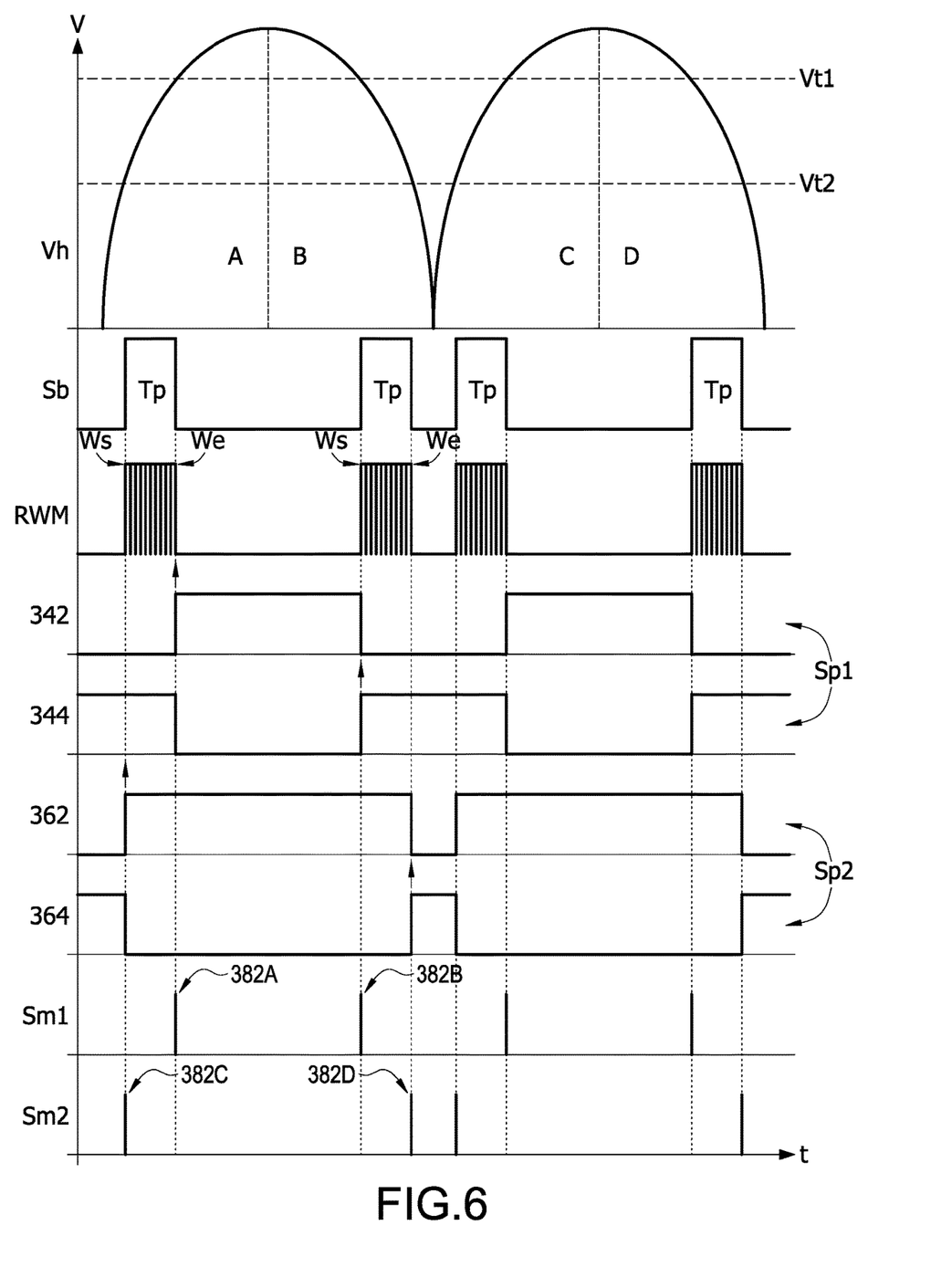
FIG. 6 is a waveform of setting burst periods by the burst setting circuit according to the present disclosure.

Please refer to FIG. 6, which shows a waveform of setting burst periods by the burst setting circuit according to the present disclosure, and also refer to FIG. 2 to FIG. 5. Take FIG. 4A as an example, each of the four waveforms A-D has a burst period Tp. The waveform of the half wave signal Sh is corresponding to the waveform of the half wave voltage Vh, and the first threshold voltage Vt1 and the second threshold voltage Vt2 respectively compare with the half wave signal Sh to provide the first comparison signal Sp1 and the second comparison signal Sp2 to the logic control circuit 38. When the half wave signal Sh rises above the second threshold voltage Vt2 (i.e., the input power source Vin at the rising edge of the positive half cycle or the falling edge of the negative half cycle), the second comparison signal Sp2 provided by the second comparison circuit 36 will cause the logic control circuit 38 to generate a burst setting signal Sb corresponding to a working start points Ws of the burst period Tp. At this condition, the control unit 2 is enabled by the burst setting signal Sb and provides the pulse width modulation signal PWM to control the conversion circuit 1 to start the burst operation. When the half wave signal Sh rises from the second threshold voltage Vt2 to above the first threshold voltage Vt1 (i.e., the input power source Vin at the rising edge of the positive half cycle or the falling edge of the negative half cycle), the first comparison signal Sp1 provided by the first comparison circuit 34 will cause the logic control circuit 38 to generate the burst setting signal Sb corresponding to a working end point We of the burst period Tp. At this condition, the control unit 2 is disabled by the burst setting signal Sb so that the conversion circuit 1 to end the burst operation.

Afterward, when input power source Vin rises to the peak value and reverses downward, and the half wave signal Sh drops below the first threshold voltage Vt1 (i.e., the input power source Vin at the falling edge of the positive half cycle or the rising edge of the negative half cycle), the first comparison signal Sp1 provided by the first comparison circuit 34 will cause the logic control circuit 38 to generate the burst setting signal Sb corresponding to the working start point Ws of the burst period Tp. At this condition, the control unit 2 is enabled by the burst setting signal Sb and provides the pulse width modulation signal PWM to control the conversion circuit 1 to start the burst operation. When the half wave signal Sh drops from the first threshold voltage Vt1 to less than the second threshold voltage Vt2 (i.e., the input power source Vin at the falling edge of the positive half cycle or the rising edge of the negative half cycle), the second comparison signal Sp2 provided by the second comparison circuit 36 will cause the logic control circuit 38 to generate the burst setting signal Sb corresponding to the working end point We of the burst period Tp. At this condition, the control unit 2 is disabled by the burst setting signal Sb so that the conversion circuit 1 to end the burst operation. In one embodiment, the first threshold voltage Vt1 and the second threshold voltage Vt2 are constant voltage values, but not limited thereto. In other words, the first threshold voltage Vt1 and the second threshold voltage Vt2 may also be non-constant voltage values, i.e., the first threshold voltage Vt1 and the second threshold voltage Vt2 change in a curve. The first threshold voltage Vt1 and the second threshold voltage Vt2 may be equal ratio curves, which is the same curve so that the length of the burst period Tp in the waveform A and the waveform B (or the waveform C and the waveform D) is equal.

Alternatively, the first threshold voltage Vt1 and the second threshold voltage Vt2 may be non-equal ratio curves so that the length of the burst period Tp in the waveform A and the waveform B (or the waveform C and the waveform D) is not equal.

Figure 7:
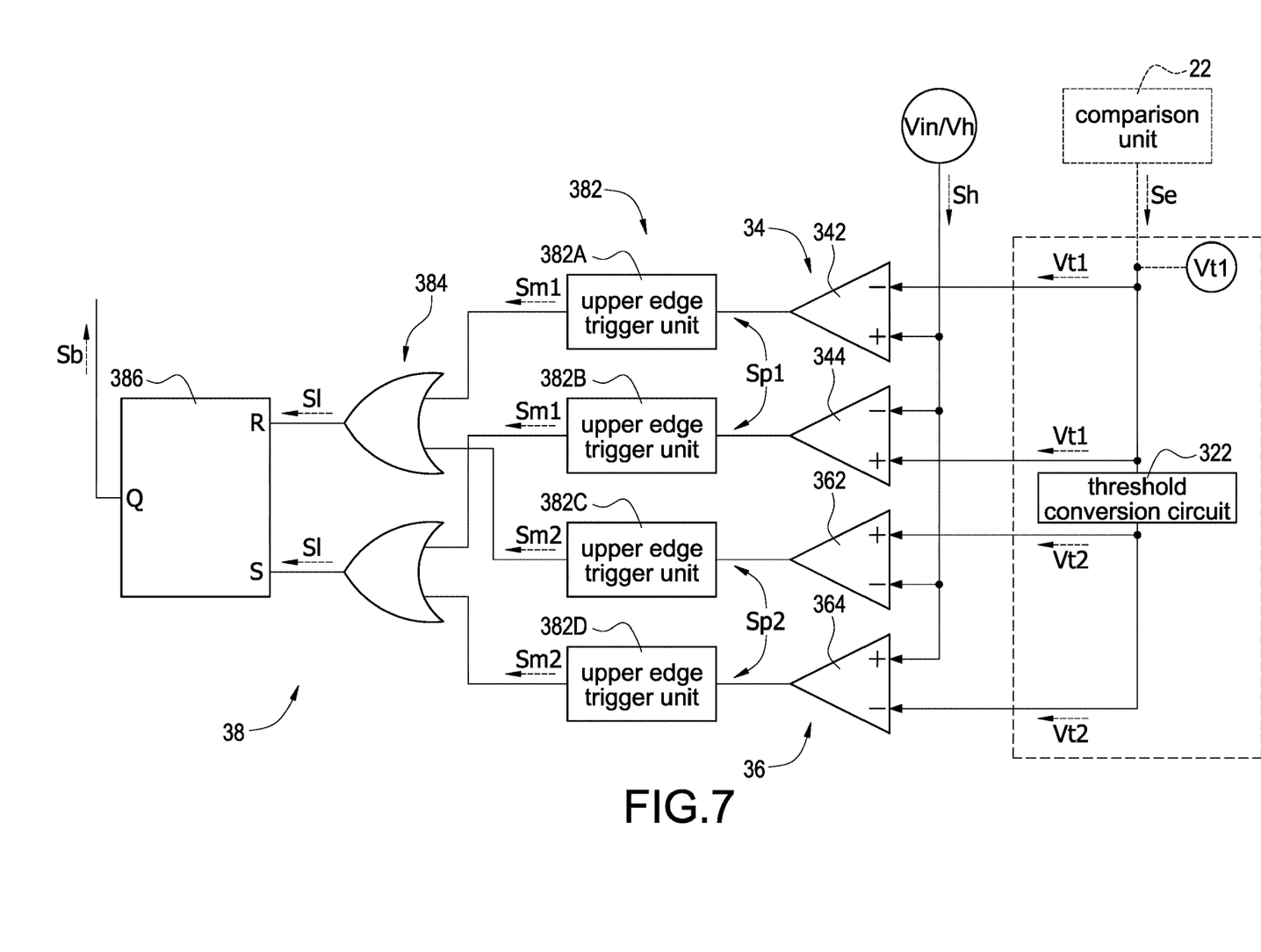
FIG. 7 is a block circuit diagram of the burst setting circuit according to the present disclosure.

Please refer to FIG. 7, which shows a block circuit diagram of the burst setting circuit according to the present disclosure, and also refer to FIG. 2 to FIG. 6. Take FIG. 4A as an example, each of the four waveforms A-D has a burst period Tp. The threshold generation circuit 32 includes a threshold conversion circuit 322, and the threshold conversion circuit 322 receives at least one first threshold voltage Vt1. The threshold conversion circuit 322 converts the at least one first threshold voltage Vt1 into at least one second threshold voltage Vt2, and the at least one second threshold voltage Vt2 is less than the at least one first threshold voltage Vt1 corresponding to at least one second threshold voltage Vt2. Specifically, whether the first threshold voltage Vt1 is singular or plural, after conversion by the threshold conversion circuit 322, a second threshold voltage Vt2 corresponding to the first threshold voltage Vt1 can be generated. The threshold conversion circuit 322 can calculate the at least one second threshold voltage Vt2 that is less than the corresponding first threshold voltage Vt1 according to a formula as follows, $$Vt2 = Vt1(-1) + Vbias, \text{ where } Vbias \text{ is a constant.}$$

The first threshold voltage Vt1 can be acquired by multiple manners. For example but not limited to that the first threshold voltage Vt1 may be acquired by an external device, such as a waveform generator, or the first threshold voltage Vt1 may be acquired by the threshold generation circuit 32 (for example, a waveform generator is built in the threshold generation circuit 32), or the first threshold voltage Vt1 may be acquired through the error signal Se and the threshold generation circuit 32 is coupled between the comparison unit 22 and the multiplier 24 of the control unit 2, or the first threshold voltage Vt1 may be acquired through the feedback signal Sf and the threshold generation circuit 32 is coupled to the comparison unit 22 of the control unit 2. In one embodiment, the first threshold voltage Vt1 may be acquired by converting the least one second threshold voltage Vt2 by the threshold conversion circuit 322, and the conversion operation is the opposite of the above.

The first comparison circuit 34 includes a first comparator 342 and a second comparator 344. A negative end of the first comparator 342 and a positive end of the second comparator 344 receive the first threshold voltage Vt1; a positive end of the first comparator 342 and a negative end of the second comparator 344 receive the half wave signal Sh. When the half wave signal Sh is less than the first threshold voltage Vt1, the first comparator 342 outputs the first comparison signal Sp1 with a low level and the second comparator 344 outputs the first comparison signal Sp1 with a high level. On the contrary, the first comparator 342 outputs the first comparison signal Sp1 with the high level and the second comparator 344 outputs the first comparison signal Sp1 with the low level. The second comparison circuit 36 includes a third comparator 362 and a fourth comparator 364. A positive end of the third comparator 362 and a negative end of the fourth comparator 364 receive the second threshold voltage Vt3; a negative end of the third comparator 362 and a positive end of the fourth comparator 364 receive the half wave signal Sh. When the half wave signal Sh is less than the second threshold voltage Vt2, the third comparator 362 outputs the second comparison signal Sp2 with a high level and the fourth comparator 364 outputs the second comparison signal Sp2 with a low level. On the contrary, the third comparator 362 outputs the second comparison signal Sp2 with the low level and the fourth comparator 364 outputs the second comparison signal Sp2 with the high level.

The logic control circuit 38 includes an edge trigger circuit 382, an or gate circuit 384, and a flip flop 386. The or gate circuit 384 is coupled to the edge trigger circuit 382 and the flip flop 386. The edge trigger circuit 382 includes four upper edge trigger units 382A-382D, and the upper edge trigger units 382A-382D are respectively coupled to the comparators 342,344,362,364. The upper edge trigger units 382A-382D generate pulsed edge trigger signals Sm1, Sm2 when the first comparison signal Sp1 and the second comparison signal Sp2 are changed from a low level to a high level. The upper edge trigger units 382A,382B provide at least one first edge trigger signal Sm1 to the or gate circuit 384 according to at least one first comparison signal Sp1. The upper edge trigger units 382C,382D provide at least one second edge trigger signal Sm2 to the or gate circuit 384 according to at least one second comparison signal Sp2. The trigger points of the first edge value trigger signal Sm1 and the second edge value trigger signal Sm2 may correspond to the positions of the working start points Ws and the working end points We shown in FIG. 6.

The or gate circuit 384 includes a first or gate 384A and a second or gate 384B. The first or gate 384A and the second or gate 384B both receive the first edge trigger signal Sm1 and the second edge value trigger signal Sm2. When the first edge trigger signal Sm1 or the second edge value trigger signal Sm2 has a pulse wave, a logic signal S1 with a logic 1 is provided to the flip flop 386. On the contrary, when neither the first edge trigger signal Sm1 nor the second edge value trigger signal Sm2 has a pulse wave, the logic signal S1 with a logic 0 is provided to the flip flop 386. A reset end R of the flip flop 386 is coupled to the first or gate 384A, a set end S of the flip flop 386 is coupled to the second or gate 384B, and an output end Q of the flip flop 386 is coupled to the pulse width modulation unit 26. When the set end S is "1" and the reset end R is "0", a burst setting signal Sb with a high level is provided from the output end Q to the pulse width modulation unit 26. When the set end S is "0" and the reset end R is "1", a burst setting signal Sb with a low level is provided from the output end Q to the pulse width modulation unit 26. When the set end S is "0" and the reset end R is "0", a burst setting signal Sb with a previous level is provided. The circuit configuration of the burst setting circuit 3 of FIG. 4B is similar to that of FIG. 4A, and the difference is only that the circuit components inside the burst setting circuit 3 are increased by the increase of the burst period Tp. The circuit configuration of the burst setting circuit 3 in FIG. 4B is similar to that in FIG. 4A, and the difference is only that the circuit components inside the burst setting circuit 3 are increased by the increase of the burst periods Tp. In addition, the design of the logic control circuit 38 is not limited to the above embodiment, and for example, any logic control circuit 38 that can generate a burst setting signal Sb according to the comparison signals Sp1, Sp2 should be included in the scope of the present embodiment.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power factor correction circuit with burst setting, comprising:
a conversion circuit configured to receive an input power source,
a control unit coupled to the conversion circuit and configured to control the conversion circuit to convert the input power source into an output power source, and
a burst setting circuit coupled to the conversion circuit and the control unit,
wherein, the burst setting circuit is configured to respectively set at least one burst period at a rising edge of a positive half cycle, a falling edge of the positive half cycle, the rising edge of a negative half cycle, and the falling edge of the negative half cycle, and provide a burst setting signal corresponding to the at least one burst period to the control unit so that the control unit is configured to limit the conversion circuit to perform a burst operation during the at least one burst period.

2. The power factor correction circuit with burst setting in claim 1, wherein a middle point of the at least one burst period is not at a zero point and a peak value of the positive half cycle and the negative half cycle.

3. The power factor correction circuit with burst setting in claim 1, wherein a period width of the at least one burst period is proportional to a load of the conversion circuit.

4. The power factor correction circuit with burst setting in claim 1, wherein the at least one burst period at the rising edge of the positive half cycle, at the falling edge of the positive half cycle, at the rising edge of the negative half cycle, and at the falling edge of the negative half cycle is in a symmetrical arrangement.

5. The power factor correction circuit with burst setting in claim 1, wherein the burst setting circuit comprises:
a threshold generation circuit configured to provide at least one first threshold voltage and at least one second threshold voltage,
a first comparison circuit coupled to the threshold generation circuit and the conversion circuit,
a second comparison circuit coupled to the threshold generation circuit and the conversion circuit, and
a logic control circuit coupled to the first comparison circuit, the second comparison circuit, and the control unit,
wherein, the first comparison circuit is configured to provide at least one first comparison signal to the logic control circuit according to the at least one first threshold voltage and a half wave voltage corresponding to the input power source; the second comparison circuit is configured to provide at least one second comparison signal to the logic control circuit according to the at least one second threshold voltage and the half wave voltage; the logic control circuit is configured to provide the burst setting signal to the control unit according to the at least one first comparison signal and the at least one second comparison signal.

6. The power factor correction circuit with burst setting in claim 5, wherein the logic control circuit is configured to set a working end point of the at least one burst period at the rising edge of the positive half cycle and the falling edge of the negative half cycle and set a working start point of the at least one burst period at the falling edge of the positive half cycle and the rising edge of the negative half cycle according to the at least one first comparison signal.

7. The power factor correction circuit with burst setting in claim 5, wherein the logic control circuit is configured to set a working start point of the at least one burst period at the rising edge of the positive half cycle and the falling edge of the negative half cycle and set a working end point of the at least one burst period at the falling edge of the positive half cycle and the rising edge of the negative half cycle according to the at least one second comparison signal.

8. The power factor correction circuit with burst setting in claim 5, wherein the threshold generation circuit comprises:
a threshold conversion circuit configured to receive the at least one first threshold voltage,
wherein, the threshold conversion circuit is configured to convert the at least one first threshold voltage into the at least one second threshold voltage, and the at least one second threshold voltage is less than the at least one first threshold voltage corresponding to the at least one second threshold voltage.

9. The power factor correction circuit with burst setting in claim 5, wherein the threshold generation circuit is configured to acquire the at least one first threshold voltage by an external device, or the threshold generation circuit is configured to generate the at least one first threshold voltage, or the threshold generation circuit is further coupled to the control unit and the at least one first threshold voltage is acquired by the control unit.

10. The power factor correction circuit with burst setting in claim 5, wherein the logic control circuit comprises:
an edge trigger circuit coupled to the first comparison circuit and the second comparison circuit,
an or gate circuit coupled to the edge trigger circuit, and
a flip flop coupled to the or gate circuit,
wherein, the edge trigger circuit is configured to provide at least one first edge trigger signal to the or gate circuit according to the at least one first comparison signal and provide at least one second edge trigger signal to the or gate circuit according to the at least one second comparison signal; the or gate circuit is configured to provide a logic signal to the flip flop according to the at least one first edge trigger signal and the at least one second edge trigger signal so that the flip flop is configured to provide the burst setting signal to the control unit according to the logic signal.

11. The power factor correction circuit with burst setting in claim 1, wherein the control unit comprises:
a comparison unit configured to receive a feedback signal corresponding to the output power source,
a multiplier coupled to the comparison unit and the conversion circuit, and
a pulse width modulation unit coupled to the multiplier, the conversion circuit, and the burst setting circuit,
wherein, the comparison unit is configured to provide an error signal to the multiplier according to the feedback signal and a reference voltage; the multiplier is configured to provide a control signal to the pulse width modulation unit according to a half wave voltage corresponding to the input power source and the error signal; the pulse width modulation unit is configured to provide a pulse width modulation signal to control the conversion circuit according to the control signal, and limit to provide the pulse width modulation signal to the conversion circuit during the at least one burst period according to the burst setting signal so as to limit the conversion circuit to perform the burst operation during the at least one burst period.

12. The power factor correction circuit with burst setting in claim 1, wherein the conversion circuit comprises:
- a rectifying unit configured to receive the input power source, and
- a conversion unit coupled to the rectifying unit, and comprising at least one power switch coupled to the control unit,
- wherein, the rectifying unit is configured to rectify the input power source into a half wave voltage and filter the half wave voltage into a DC power source; the control unit is configured to control the conversion unit to convert the DC power source into the output source by switching on the at least one power switch.

13. A method of operating a power factor correction circuit with burst setting, comprising steps of:
- (a) providing a control unit to control a conversion circuit to convert an input power source into an output power source,
- (b) respectively setting at least one burst period at a rising edge of a positive half cycle, a falling edge of the positive half cycle, the rising edge of a negative half cycle, and the falling edge of the negative half cycle, and providing a burst setting signal corresponding to the at least one burst period, and
- (c) limiting, by the control unit, the conversion circuit to perform a burst operation during the at least one burst period according to the burst setting signal.

14. The method of operating the power factor correction circuit with burst setting in claim 13, wherein the step (b) comprises steps of:
- (b1) providing at least one first comparison signal according to at least one first threshold voltage and a half wave voltage corresponding to the input power source,
- (b2) providing at least one second comparison signal according to at least one second threshold voltage and the half wave voltage, and
- (b3) providing the burst setting signal according to the at least one first comparison signal and the at least one second comparison signal.

15. The method of operating the power factor correction circuit with burst setting in claim 14, wherein the step (b1) comprises a step of:
- (b11) converting the at least one first threshold voltage into the at least one second threshold voltage, and the at least one second threshold voltage is less than the at least one first threshold voltage corresponding to the at least one second threshold voltage.

16. The method of operating the power factor correction circuit with burst setting in claim 14, wherein the step (b3) comprises steps of:
- (b31) providing at least one first edge trigger signal according to the at least one first comparison signal and providing at least one second edge trigger signal according to at least one second comparison signal,
- (b32) providing a logic signal according to the at least one first edge trigger signal and the at least one second edge trigger signal, and
- (b33) providing the burst setting signal according to the logic signal.

17. The method of operating the power factor correction circuit with burst setting in claim 13, wherein the step (a) comprises steps of:
- (a1) rectifying, by the conversion circuit, the input power source into a half wave voltage and filtering the half wave voltage into a DC power source,
- (a2) controlling, by the control unit, the conversion circuit to convert the DC power source into the output power source,
- (a3) providing, by the control unit, an error signal according to a feedback signal corresponding to the output power source and a reference voltage,
- (a4) providing, by the control unit, a control signal according to a half wave voltage corresponding to the input power source and the error signal, and
- (a5) providing, by the control unit, a pulse width modulation signal to control the conversion circuit according to the control signal.

18. The method of operating the power factor correction circuit with burst setting in claim 17, wherein the step (c) comprises a step of:
- (c1) limiting, by the control unit, to provide the pulse width modulation signal to the conversion circuit during the at least one burst period according to the burst setting signal so as to limit the conversion circuit to perform the burst operation during the at least one burst period.

* * * * *